Nov. 14, 1950 — A. F. O'CONNOR — 2,530,072
SPRING DEVICE
Filed March 1, 1946
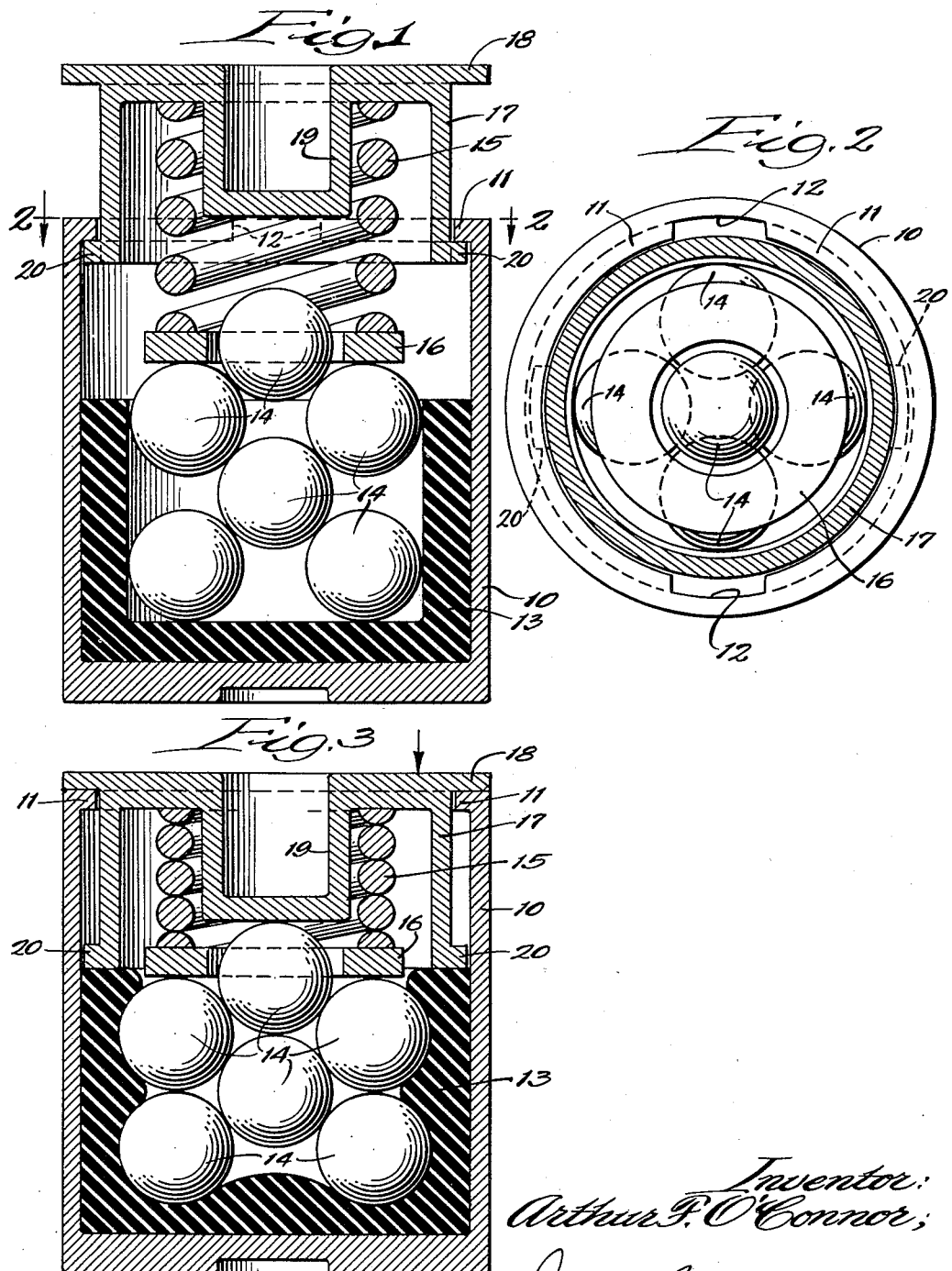
Inventor:
Arthur F. O'Connor
By Dawson, Brothers Spengenberg
Attorneys.

Patented Nov. 14, 1950

2,530,072

UNITED STATES PATENT OFFICE 2,530,072

SPRING DEVICE

Arthur F. O'Connor, Chicago, Ill., assignor to Union Asbestos & Rubber Company, a corporation of Illinois Application March 1, 1946, Serial No. 651,149

7 Claims. (Cl. 267—9)

This invention relates to spring devices and more particularly to a device for use in railway draft gears or to replace one or more of the springs in a railway car suspension.

One of the objects of the invention is to provide a spring device which provides a combined spring and snubber action to prevent the development of undesirable harmonics.

Another object is to provide a spring device in which a plurality of ball like elements to provide a snubber action are resiliently confined in an elastic sleeve or cup.

Still another object is to provide a spring device which includes a spring to absorb light loads not requiring snubbing and a plurality of ball like elements resiliently confined in a column to snub heavier loads.

Still another object is to provide a spring device in which excessive loads producing a complete collapse of the spring are resiliently cushioned to prevent damage to the spring or to other parts of the device.

The above and other objects and advantages of the invention will be more readily apparent from the following description when read in connection with the accompanying drawing, in which—

Figure 1 is an axial section through a spring device embodying the invention in extended position;

Figure 2 is a section on the line 2—2 of Figure 1; and

Figure 3 is a view similar to Figure 1 showing the parts in collapsed position.

The device, as shown, comprises a cup shaped rigid housing 10 which may be formed of steel, cast iron, or the like. Preferably the housing is cylindrical in shape and is of a size substantially the same as the size of the usual coil spring employed in railway draft gears and truck suspensions. At its open end the housing is turned in to form a flange 11 which is cut away at two or more points as indicated at 12 for a purpose to appear later.

A cup shaped resilient member 13 formed of rubber or rubber like material is mounted within the housing and may, if desired, be bonded to the housing wall. Within the member 13 a plurality of ball-like elements 14 are supported in a column. The elements 14 may be steel bearing balls or the like and are preferably of a size such that they will fit within the cup shaped member 13 substantially as shown. This construction provides a resilient snubber device generally similar to that more particularly described and claimed in my Patent No. 2,239,113.

The elements 14 are adapted to be pressed down into the cup shaped member 13 by a compression coil spring 15 seated at one end on a ring 16 which rests on the end of the column of elements adjacent the open end of the cup shaped member 13. The spring 15 is engaged to be compressed by a follower or closure 17 having a cylindrical body portion of a size to telescope within the flange 11. The follower is closed by an end plate portion 18 adapted to engage the outer spring support and which is formed at its center with an inwardly extending projection 19 extending within the coil spring 15. To hold the follower assembled on the housing, the lower end of the cylindrical body portion is formed with projecting ears or lugs 20 adapted to pass through the openings 12 and to engage the flange 11 after the follower is turned to prevent separation of the parts. It will be understood that with this construction any desired degree of pre-compression of the spring 15 can be obtained.

In use the parts normally occupy the position shown in Figure 1 with the follower moved out of the housing 10 to the maximum extent and with the spring 15 extended. Under relatively light load forces the spring 15 will be slightly compressed but will not expand the ball-like elements 14 to any substantial extent so that the device acts much in the same manner as a standard coil spring. This is desirable to prevent undue scrubbing of the ball-like elements against each other to minimize wear. Upon the application of heavier load forces, the spring 15 will be compressed to a greater extent causing the balls 14 to move over each other so that they will be expanded radially and will press into the cup member 13. Upon removal of the force, the friction of the balls against each other and against the rubber 13 produces a damping effect which will prevent the development of harmonics in the device. When maximum loads are applied, the parts will move to the position shown in Figure 3 in which the spring 15 is fully compressed. At this time the projection 19 will engage the endmost ball, as shown, so that a maximum cushioning effect is obtained. After the projection 19 engages the balls, all further forces are absorbed by the balls alone, thereby preventing damage to the spring and to other parts of the device.

It will be understood that the clearance between the projection 19 and the endmost ball may be made as large or as small as desired. In any event the balls will be held in proper relationship in the column so that they cannot be displaced from the cup member 13 under any conditions of use. This eliminates the necessity for extreme accuracy in manufacture of the parts and insures proper operation at all times. The capacity and stiffness of the unit can be changed by varying the hardness of the rubber cup 13 or by changing the size or arrangement of the balls.

While one embodiment of the invention has been shown and described in detail, it will be understood that it is illustrative only and is not to be taken as a definition of the scope of the invention, reference being had for this purpose to the appended claims.

What is claimed is:

1. A spring device comprising a plurality of ball like elements, resilient confining means supporting the elements in a column, a compressible spring acting on the elements at one end of the column, an end member acting on the spring to compress it, and a projection on the end member of a length to engage the end element of said column when the spring is fully compressed.

2. A spring device comprising a plurality of ball like elements, a cup shaped member having bottom and side walls of resilient material and supporting the elements in a column, a cup shaped housing inclosing and supporting said member, and a compressible spring acting on the elements at one end of the column to urge the elements in the direction of said bottom wall.

3. A spring device comprising a rigid cup-shaped housing, a cup of resilient material in the housing resting against the bottom and side walls of said housing, a plurality of ball like elements supported in a column in the sleeve, and a compression spring acting on the elements at one end of the column to urge the elements in the direction of said bottom wall.

4. A spring device comprising a rigid tubular housing, a sleeve of resilient material in the housing, a plurality of ball like elements supported in a column in the sleeve, a compression spring acting on the elements at one end of the column, a follower telescoping in the housing and engaging the spring to compress it, and a projection on the follower of a length directly to engage the elements when the spring is fully compressed.

5. A spring device comprising a cup-shaped rigid housing, a cup-shaped liner of resilient material fitting into the housing, a plurality of ball like elements supported in a column in the liner, and a compressible spring acting on the elements at the open end of the liner.

6. A spring device comprising a cup-shaped rigid housing, a cup-shaped liner of resilient material fitting into the housing, a plurality of ball like elements supported in a column in the liner, a compressible spring acting on the elements at the open end of the liner, a follower telescoping into the open end of the housing engaging the spring to compress it, and a projection on the follower engageable with the elements when the spring is fully compressed.

7. A spring-device comprising a rigid cup shaped housing, a cup shaped liner having bottom and side walls of resilient material fitting in the housing, a plurality of ball like elements supported in a column in the liner, a follower telescoping into the open end of the housing and engageable with the outermost of the elements to press them into the liner, and a spring acting between the follower and the column of ball like elements and exerting a continuous pressure against the column.

ARTHUR F. O'CONNOR.

REFERENCES CITED

The following references are of record in the file of this patent:

UNITED STATES PATENTS

| Number | Name | Date |
|---|---|---|
| 1,319,883 | McCormick | Oct. 28, 1919 |
| 1,461,787 | Stebbins | July 17, 1923 |
| 1,713,914 | O'Connor | May 21, 1929 |
| 2,239,113 | O'Connor | Apr. 22, 1941 |